United States Patent

Lacombe et al.

[11] Patent Number: 6,119,746
[45] Date of Patent: Sep. 19, 2000

[54] VALVE AND RIM FOR BICYCLE WHEEL PROVIDED FOR A TUBELESS ASSEMBLY

[75] Inventors: Jean-Pierre Lacombe, Oilly; Jean-Mierre Mercat, Rue de la Repubique, both of France

[73] Assignee: Mavic S.A., Saint Trivier sur Moignans, France

[21] Appl. No.: 09/121,703

[22] Filed: Jul. 24, 1998

[30] Foreign Application Priority Data

Jul. 25, 1997 [FR] France .................................. 97 09929

[51] Int. Cl.[7] .................................................. B60C 29/02
[52] U.S. Cl. ............................................ 152/415; 301/5.24
[58] Field of Search .............................. 301/5.24, 95, 96, 301/97, 98; 152/DIG. 11, 427, 415; 137/234.5, 223

[56] References Cited

U.S. PATENT DOCUMENTS

| | | | |
|---|---|---|---|
| 514,412 | 2/1894 | Callaghan | 152/427 |
| 1,426,401 | 8/1922 | Muller | 152/427 |
| 1,726,243 | 8/1929 | Scott et al. | 137/232 |
| 1,738,927 | 12/1929 | Salerni | 152/429 |
| 1,957,866 | 5/1934 | Watson | 152/DIG. 7 |
| 2,228,984 | 1/1941 | Broecker | 137/234.5 |
| 2,236,585 | 4/1941 | Wahl | 137/234.5 |
| 2,937,905 | 5/1960 | Altenburger | 301/97 |
| 3,008,770 | 11/1961 | Mueller | 301/97 |
| 3,561,467 | 2/1971 | Lutz | 137/234.5 |
| 3,656,531 | 4/1972 | Ross et al. | 152/10 |
| 3,889,530 | 6/1975 | Bluem | 137/228 |
| 4,557,308 | 12/1985 | Kuypers | 152/427 |
| 5,064,250 | 11/1991 | Yashiro et al. | 301/64.4 |
| 5,490,719 | 2/1996 | Lew | 301/5.24 |
| 5,499,864 | 3/1996 | Klein et al. | 301/95 |
| 5,509,438 | 4/1996 | Leonard et al. | 137/234.5 |
| 5,538,058 | 7/1996 | Aloy | 152/427 |
| 5,603,553 | 2/1997 | Klieber et al. | 301/37.41 |
| 5,651,591 | 7/1997 | Mercat et al. | 301/95 |
| 5,653,510 | 8/1997 | Osborne | 301/95 |
| 5,746,850 | 5/1998 | Luscher et al. | 152/339.1 |
| 5,806,935 | 9/1998 | Shermeister | 301/104 |
| 5,941,606 | 8/1999 | Chen | 301/99 |

FOREIGN PATENT DOCUMENTS

| | | |
|---|---|---|
| 0240241 | 10/1987 | European Pat. Off. . |
| 0615865 | 9/1994 | European Pat. Off. . |
| 0633150 | 1/1995 | European Pat. Off. . |
| 0579525 | 1/1996 | European Pat. Off. . |
| 1077548 | 3/1960 | Germany . |
| 3727051 | 2/1989 | Germany . |
| 814371 | 6/1959 | United Kingdom . |
| WO93/09963 | 5/1993 | WIPO . |

*Primary Examiner*—S. Joseph Morano
*Assistant Examiner*—Long Baa Nguyen
*Attorney, Agent, or Firm*—Greenblum & Bernstein, P.L.C.

[57] ABSTRACT

An inflation valve provided to inflate a cycle tire assembled without an air tube on a rim. The valve has a body crossed by a conduit, with a first part being designed to cross the casing of the rim, and a second part adapted to connect an inflating means. The valve has an injection nozzle located in the extension of the first part, a sealing joint located around the injection nozzle, and in that the first part or nozzle has an assembly device designed to cooperate with the complementary assembly device of the rim.

15 Claims, 3 Drawing Sheets

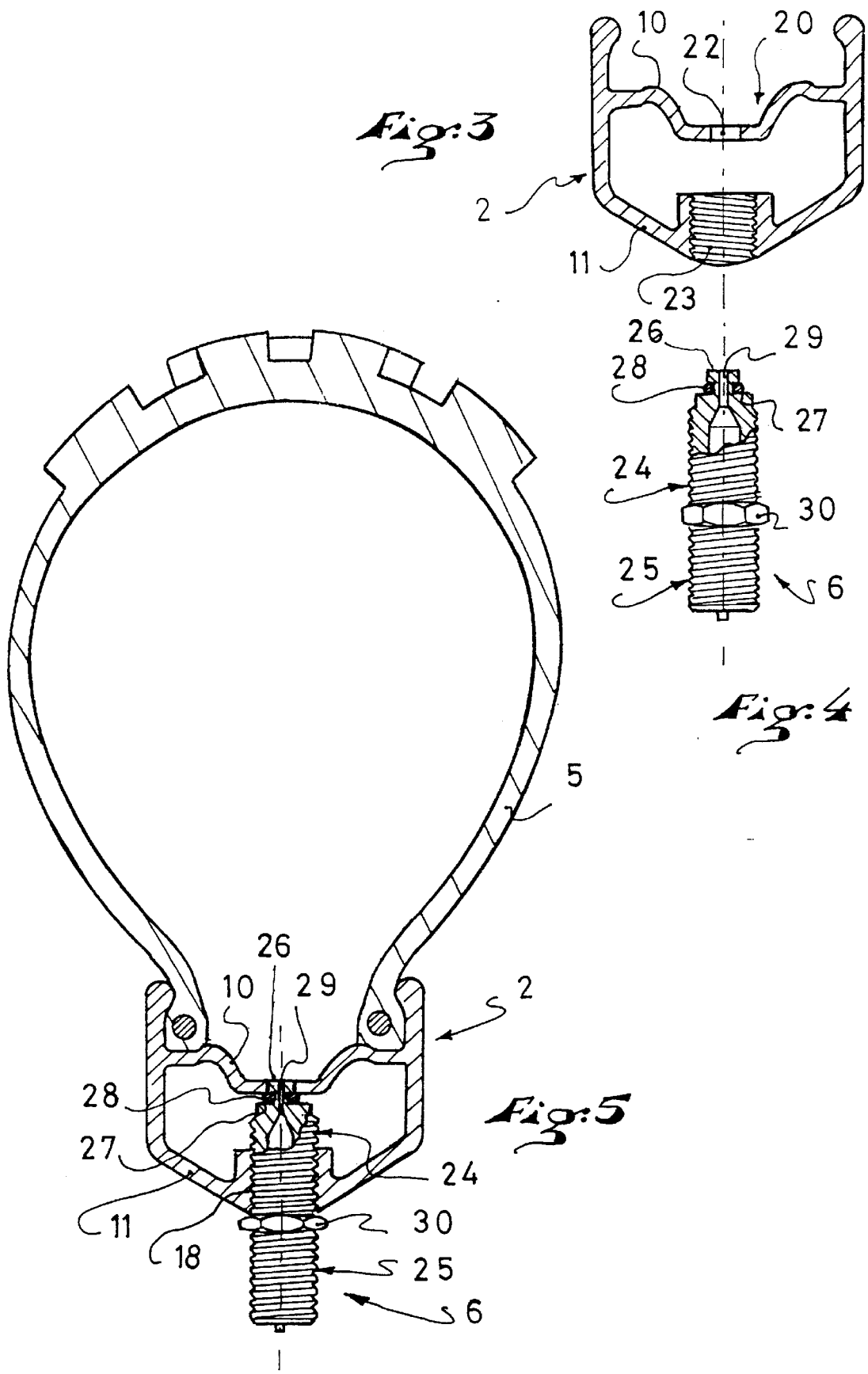

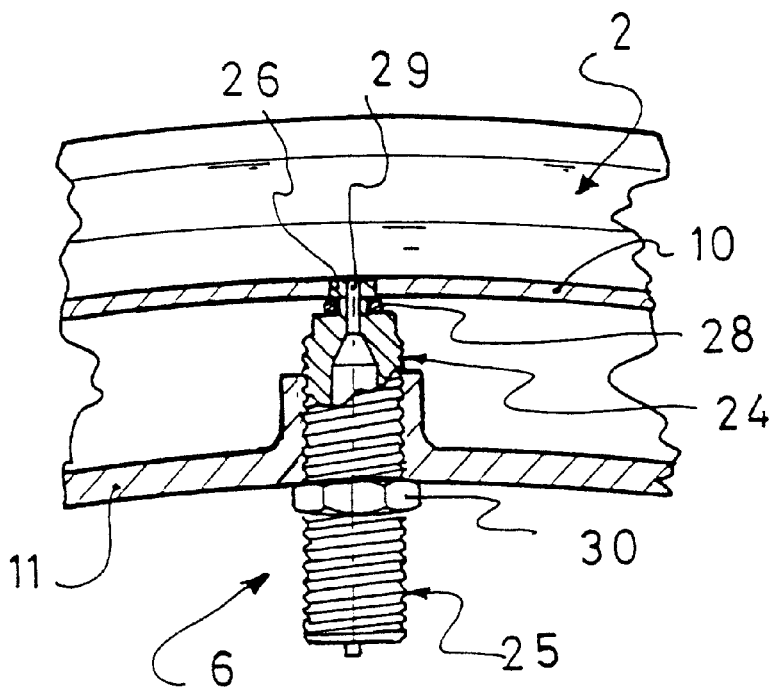
Fig: 6
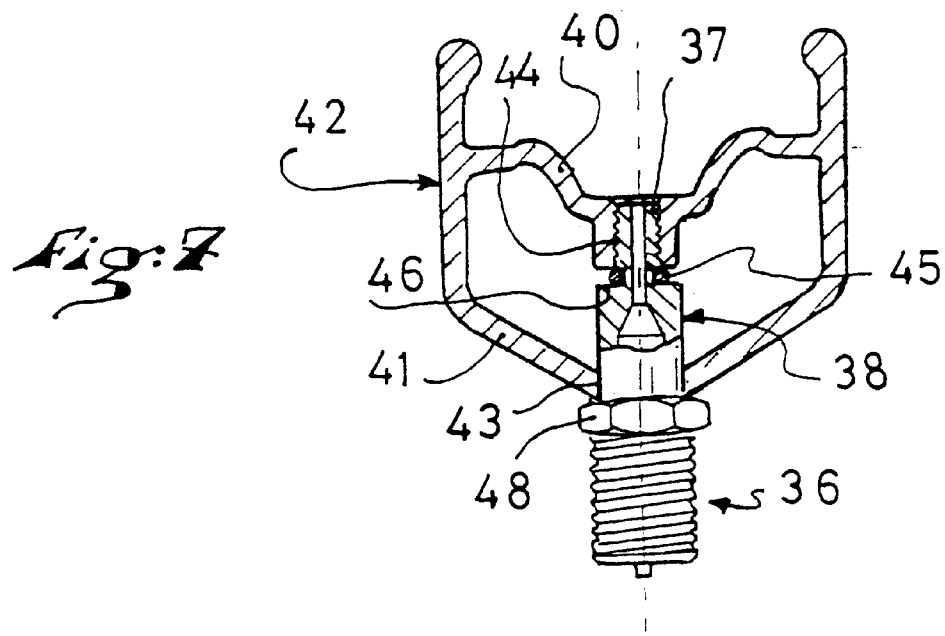
Fig: 7

VALVE AND RIM FOR BICYCLE WHEEL PROVIDED FOR A TUBELESS ASSEMBLY

BACKGROUND OF THE INVENTION

1. Field of the Invention

The invention is related to a valve for a bicycle rim designed for a tubeless assembly of the tire, or in other words, an assembly without an air tube.

The invention is also related to a bare rim designed for a tubeless assembly, a rim and a complete wheel equipped with such a valve.

2. Description of Background and Relevant Information

Wheels without air tubes are advantageous because they save on the weight, cost, and assembly of the air tube. In addition, there are fewer risks of flat tires. In fact, a foreign body that crosses the wall of the tire generally remains imprisoned in the tire, such that even under such circumstances, the wheel remains inflated longer than a wheel equipped with an air tube.

Wheels devoid of air tubes have been disclosed in numerous patent applications or published patents, for example, the patent applications published as DE 37 27 051, EP 615865, or U.S. Pat. No. 3,008,770.

All these disclosures describe means that seal the rim in the area of the passage openings for the spokes. These means generally consist of a rim base that covers the spoke openings and laterally joins the edges of the tire so as to define a closed cavity.

A patent application published as WO 93/09963 discloses a dual bridge rim, the upper bridge of which is not bored, and where the spoke nuts are screwed directly in the lower bridge. The sealed cavity is thus defined by the upper bridge of the rim and the tire.

As such, it is known how to seal or almost seal an annular cavity formed between the tire and the rim, without having to use an air tube.

The problem that arises, however, consists of filling this cavity with air via a valve that crosses the wall of the rim. In addition, the passage of the rim wall by the valve must also be sealed. There are some constructions that associate the valve to the rim base. The European patent application published as EP 616 911 discloses such a rim base.

However, this does not resolve all problems related to sealing. In addition, changing the valve means having to dismantle the tire completely. Finally, it makes the rim base indispensable, even though this element is largely useless in the absence of an air tube.

SUMMARY OF THE INVENTION

An object of the invention is to propose a valve designed for a rim to be assembled without an air tube, that is easy to manufacture, easy to install on a rim, and easy to change if necessary.

Another object of the invention is to propose a bare rim designed to receive the preceding valve, the rim being simple to manufacture in the area of the valve-receiving opening, easy to assemble and, if necessary, easy to dismantle, without having to disassemble the tire.

Another object of the invention is to propose a rim equipped with a valve that ensures an excellent seal in the area of the connection between the rim and the valve.

These and other objects of the invention are achieved by an inflation valve comprising a body that is crossed by a conduit, with a first part being designed to cross the rim casing, and a second part being designed to connect an inflation means, wherein it has an injection nozzle located in the extension of the first part, a sealing joint located around the injection nozzle, and in that the first part or nozzle has assembly means that are designed to cooperate with the complementary assembly means of the rim.

The rim according to the invention has a casing formed by an upper bridge, a lower bridge, two flanks that extend beyond the upper bridge via two tire gripping wings, two openings in each other's extensions at each of the bridges for the passage of the valve, the valve comprising a body with a first part being designed to cross the casing and a second part being designed to grip the inflating means. The first opening of the rim located on the lower bridge has a diameter that is greater than the second opening of the upper bridge; the first part of the valve becomes extended by an injection nozzle having a smaller diameter, that is engaged in the second opening of the rim; a sealing joint is provided between the injection nozzle and the upper bridge; and the complementary assembly means respectively assemble the nozzle or the first part of the body to the upper bridge or the lower bridge of the rim.

BRIEF DESCRIPTION OF THE DRAWINGS

The invention will be better understood in light of the following description and the annexed drawings that constitute an integral part thereof, wherein:

FIG. 3 illustrates the rim of FIG. 1 according to a transverse section provided in the area of the opening intended for the valve;

FIG. 4 illustrates a valve designed to equip the previous rim;

FIGS. 5 and 6 illustrate different sections of the rim equipped with the valve; and FIG. 7 illustrates an embodiment variation of the invention.

DETAILED DESCRIPTION OF THE INVENTION

Figure 1:
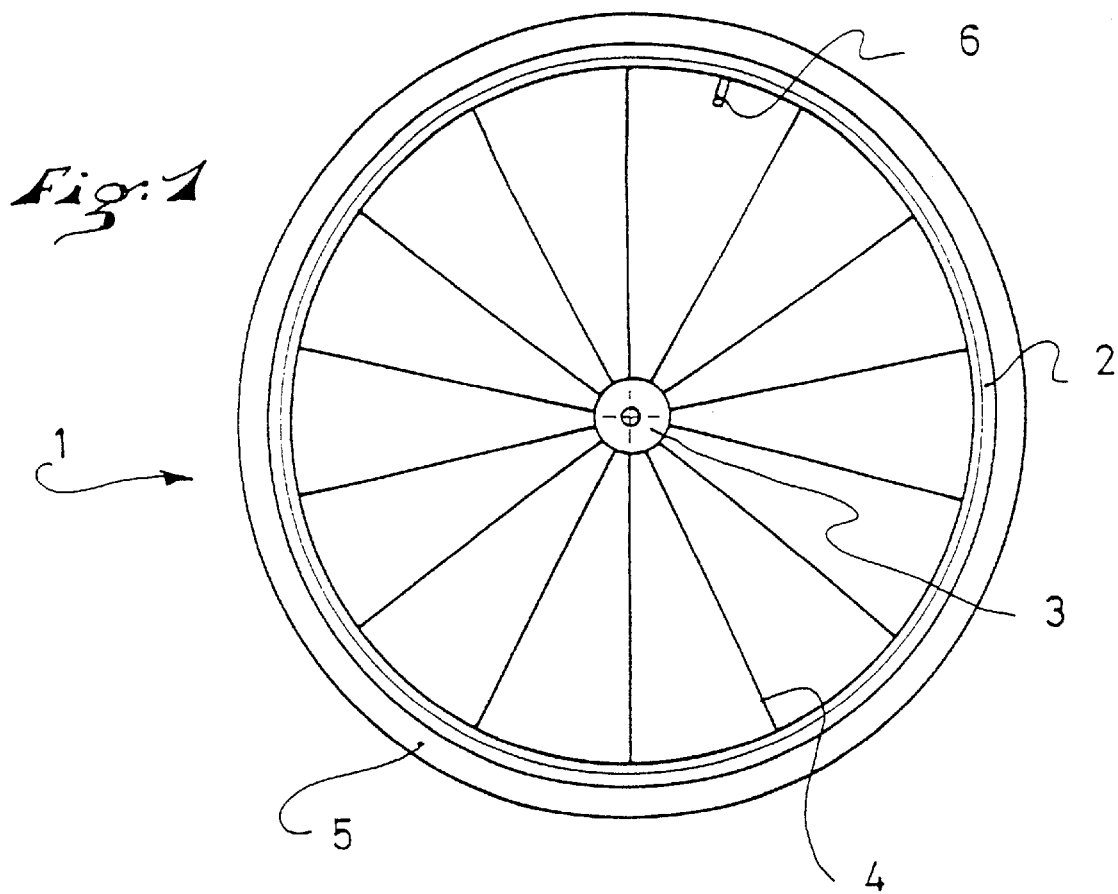
FIG. 1 illustrates a wheel in a side view.

FIG. 1 represents a wheel 1 comprising, in a known manner, a rim 2 connected to a central hub 3 by two sets of spokes. Only the set of spokes 4 is visible in FIG. 1. The spokes are of any appropriate type, straight or bent, and they can be arranged as desired in the manner of radial or crisscrossed spokes. In addition, the wheel represented could either be a front wheel or a rear wheel.

In a known manner, the rim is made from a curved section, whose two ends are preferably joined together by welding so as to obtain a good seal in this area.

The wheel 1 represented in FIG. 1 is also equipped with a tire 5. The tire 5 is a tire of standard dimensions. The dimensions of the tire have been, for example, defined by the standard ISO 5775-1.

In a known manner, such a tire has a central running tread bordered by two lateral flanks. The base of the lateral flanks or heel is slightly thicker, and encloses a rigid or flexible rod having a defined length.

The wheel 1 represented in FIG. 1 also has an inflation valve 6 that is an object of the invention and is described in detail below.

Figure 2:
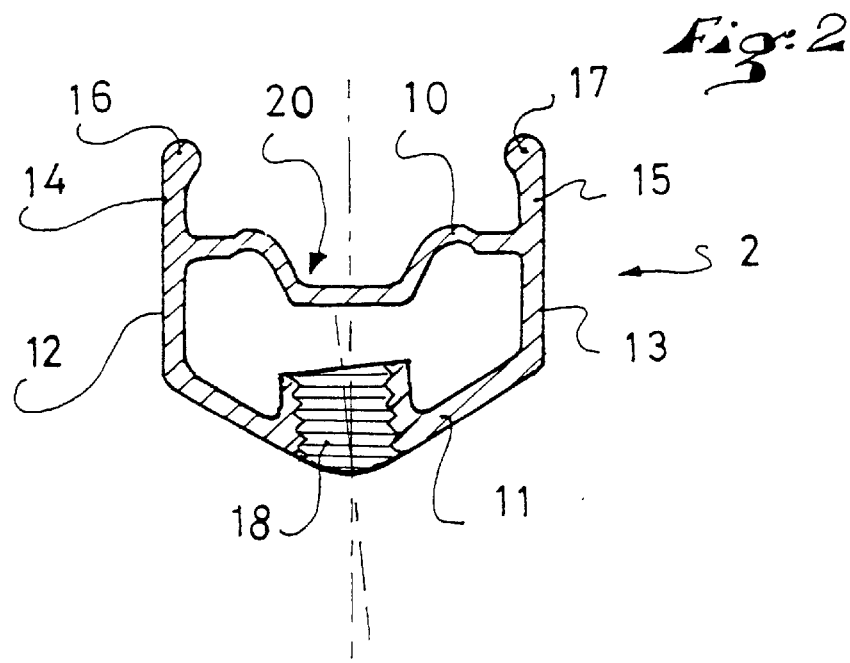
FIG. 2 illustrates a sectional view of a rim in the area of the spoke gripping opening obtained according to a preferred embodiment.

FIG. 2 represents the contour of the rim 2 according to a preferred embodiment of the invention.

The rim 2 is designed for a tubeless assembly of the tire 5. In a known manner, the rim 2 has an upper bridge 10, a lower bridge 11 connected together by two flanks 12 and 13, so as to form a casing. The flanks become extended towards the outside via wings 14 and 15, at the end of which there are flanges 16, 17 that act as hooks with respect to the tire flanks. All of these elements are known.

In a preferred manner, the rim 2 has gripping openings 18 for the spokes that are located only in the area of the lower bridge 11. Thus, the upper bridge 10 is not bored with openings for the passage or gripping of the spokes, and this guarantees a perfect seal for the upper bridge.

The opening 18 is threaded to allow the screwing of a nut or a gripping nozzle, as well as the tension adjustment of the spoke. All these elements are of any appropriate type.

In a preferred manner, the lower bridge is bored according to an extrusion boring technique. According to this technique, instead of being cut, the material is pushed back so as to form a kind of chimney. This chimney enables the bridge not to become weakened in this area. It also provides an inner surface that can be threaded easily.

This boring method is not restrictive, and any method for gripping the spokes could suffice.

According to the embodiment illustrated, the upper bridge 10 has an annular groove 20 in its median portion. The groove is intended to facilitate the assembly of the tire. However, such a groove, its shape and dimensions have not been restricted by the invention.

FIG. 3 represents the rim 2 in a transverse section in the area of the boring designed for the valve 6 represented in FIG. 4. In a known manner, this zone is located between two borings designed to grip the spokes.

The valve 6 represented in FIG. 4 has a hollow body with an internal conduit 29 which crosses it from one side to the other. Externally, the valve 6 has a body that is generally cylindrical, with a rim engaging part 24 that is designed to cross the casing of the rim between the two bridges 10 and 11, and external part 25 that projects outside the casing. In a known manner, this second portion is designed to be connected to a pump or an external inflating means.

An injection nozzle 26 having a smaller diameter extends the part 24. This injection nozzle 26 is designed to cross the upper bridge 10 of the rim 2 via opening 22. The junction between the injection nozzle 26 and the part 24 forms a shoulder 27. A joint, for example an O-ring joint 28 is engaged on the injection nozzle, potentially in the area of a groove. This joint is designed to be compressed between the shoulder 27 and the upper bridge 10 of the rim, and obtain a seal in this area. In a known manner, the valve body 6 has an internal conduit 29 that crosses it from one side to the other depending on the longitudinal direction defined by the valve.

According to the invention, the part 24 of the valve body or the injection nozzle 6 is equipped with assembly means designed to cooperate with complementary threads of one of the bridges 10 or 11 of the rim 2.

The embodiment illustrated shows a part 24 threaded on its external surface. This threading is designed to be screwed in a threaded opening 23 of the rim. However, as shall be mentioned later, means other than threading can also be used.

According to the embodiment illustrated, between the two parts 24 and 25, the valve body 6 has a ring 30. This ring 30 is designed to take support against the external surface of the lower bridge 11. As illustrated, the ring 30 could have a hexagonal external section, so as to allow the tightening of the valve 6 in its housing, or its disassembly by a tool such as a key. Other means could also suffice.

Part 25 of the valve 6 that is designed to connect an inflating means with the internal mechanism of the valve 6 can be of any appropriate type.

It is known that valves for cycles have been defined by the ETRTO standard (European Tire and Rim Technical Organization).

Cycles valves known as "PRESTA" are available commercially. These have a body having a diameter of 6.2 mm and a mobile valve that can be latched into a blocking position by a small milled nut.

Also known are automobile type valves with a body whose diameter is 8.3 mm, and a mobile valve mounted inside the body and returned by a spring.

The valve body 6 according to the instant invention can be designed in such a way that its projecting part 25 has normal dimensions both internally and externally in order to receive a valve of a known type, and in order to get connected to pumps or other usual inflating means.

One could also design a valve body as described previously, which could receive an attached element that would fulfill these connection and blocking functions.

In a known manner, valve bodies, at least those of the automobile type, have a threaded end in order to receive a plug. This threading, located in the second part of the body, could be extended in the direction of the injection nozzle. Thus, the first and second parts would be threaded in each other's extensions, at the same pitch. Under these circumstances, the ring 30 can be a threaded attached element that is screwed on the body 6 and that acts in the manner of a counters-crew.

The rim designed to cooperate with the valve will now be described with reference to FIGS. 3, 5 and 6.

The rim is bored with an opening 23 at its lower bridge 11, and, in the extension, with an opening 22 located on the bridge upper 10, at the base of the groove annula 20. The opening 23 is bored and threaded to the diameter and threading pitch of the part 24 of the valve 6.

Preferably, this opening 23 is obtained by the same extrusion boring technique as was used for the spoke grips, so as to form a chimney that is then threaded. The inner diameter of the chimney and the threading pitch are adapted to the dimensions of the part 24 of the valve and to its threading pitch.

The opening 22 corresponds to the diameter of the injection nozzle 26. The length of the nozzle 26 is preferably determined such that the nozzle 26 crosses the opening 22 and such that its end brushes the outer surface of the upper bridge 10, i.e., the base of the annular groove 20, or stands back therefrom, depending on the thickness of the joint 28 and its compression during tightening. This is done with the aim of not hampering the assembly of the tire 5 on the rim 2. When the valve 6 is mounted on the rim 2, the shoulder 27 compresses the joint 28 against the wall of the upper bridge 10. Under these conditions, the joint 28 ensures the seal between the inside of the tire and the 29 of the valve internal conduit or through opening 6. Since the upper bridge 10 has no other openings, as per the embodiment described, the sealing conditions are excellent in the area of the rim 2. In addition, the assembly method via screwing ensures a very good retention of the valve body 6 in the rim 2. Indeed, there is a mechanical assembly between the valve 6 and the rim 2, and the valve is retained in the area of both the bridges 10, 11 of the rim 2.

Preferably, the ring 30 is designed to be tightened against the lower bridge 11 and, in this way, stop the tightening of the valve 6. The objective is to avoid any excessive compression of the joint 28 which could be damaging to it, and also to avoid any excessive tightening that could risk stressing the two bridges 10, 11 at specific points when they become spaced apart. For this, purpose either the ring 30 is located along the body 6 at a distance from the shoulder 27 that is approximately equal to the distance between the two bridges 10 and 11, or else it is mobile along the body and is tightened against the lower bridge 11 in the manner of a counter-nut.

From the preceding description, it is easy to understand that the assembly and disassembly of the valve 6 are obtained very simply by screwing or unscrewing from the outside of the rim 2. In particular, the assembly and disassembly operations are completely independent of the presence or absence of the tire time. The valve 6 can therefore be changed without requiring any disassembly of the tire 5. Similarly, a tire 5 could be disassembled and reassembled without having to touch the valve 6.

The embodiment described hereinabove implements assembly using screwing or threaded engagement. Such an assembly method is not restrictive, and other means besedes threads could also be used, for example, a bayonet method using a quarter revolution or other, or even quick assembly means of the clip or rivet type. It is important to obtain a mechanical assembly of the valve with one of the bridges 10, 11, which also ensures a seal between the injection nozzle 26 and the upper bridge 10. It must also be noted that in the present case, the assembly of the valve 6 uses only one element, i.e., the valve itself.

As an example, the assembly of the tire 5 on its rim 2 and its inflation are obtained in the following manner.

First, the flanks 12, 13 of the tire 5 are engaged on one of the wings of the rim 2, and they are kept engaged in the groove 20. The fact that the valve 6 does not project inside the groove 20 is advantageous because it does not hinder this operation. The naturally elasticity of the tire 5 ensures that the flanks 12, 13 get pressed against the edges of the groove 20. In these conditions, the injection nozzle 26 ends in the volume of the tire 5. In addition, a relative seal already exists between the tire 5 and the edges of the groove 20. This seal is reinforced with the primary inflation of the tire 5, until, under the effect of pressure, the flanks 12, 13 of the tire 5 cross the edges of the groove 20 and get pressed against the wings 14, 15.

FIG. 7 illustrates an embodiment variation. According to this variation, the valve 36 has a threaded injection nozzle 37, and a rim engaging part 38 designed to cross the lower bridge 41 has a external surface.

The rim 42 has a casing with a lower bridge 41 and an upper bridge 40. The lower bridge 41 has a opening or hole 43, bored to the diameter of the part 38, and the upper bridge 40 has a hole 44, with an extrusion boring, that is threaded to the diameter of the injection nozzle 37. As in the previous case, an annular joint 45 is designed to be compressed between the edge of the hole 44 and a shoulder 46 at the junction between the injection nozzle 37 and the remainder of the body.

Also preferably, a ring 48 similar to the ring 30 cooperates with the lower bridge 41 of the rim 42 so as to limit the tightening of the valve 36, in order to avoid the crushing of the joint 45 or excessive stresses during the distancing of the bridges 40, 41.

As was the case previously, preferably the injection nozzle 37 brushes or is flush with the outer surface of the upper bridge 40, or stands back therefrom.

The invention is not limited to the various embodiments that have been described, and other variations are possible. In particular, the invention could apply to other rim contours than the one described and illustrated herein. The nature and type of assembly of the sealing joint 28 could also be different.

The instant application is based upon the French priority patent application No. 97 09929, filed on Jul. 25, 1997, the disclosure of which is hereby incorporated by reference thereto in its entirety, and the priority of which is hereby claimed under 35 USC 119.

What is claimed is:

1. A rim for a tubeless tire, comprising:

a casing comprising an upper bridge, a lower bridge, two flanks that extend beyond the upper bridge via two tire gripping wings, a first opening in the lower bridge and a second opening in the upper bridge for the passage of a valve designed to inflate the tire, wherein the first opening comprises a greater diameter than the second opening, and wherein one of the first opening and the second opening comprises internal threads that are designed to cooperate with external threads of the valve.

2. A rim as defined by claim 1, wherein one of the first opening and the second opening comprises is an opening which is formed by extrusion boring, and comprises an inner wall which is threaded.

3. A rim for a tubeless tire equipped with an inflation valve, the rim comprising:

a casing comprising an upper bridge, a lower bridge, two flanks that extend beyond the upper bridge via two tire gripping wings, a first opening in the lower bridge and a second opening in the upper bridge for the passage of the inflation valve, the inflation valve comprising a body including a first part designed to cross the casing and a second part designed to connect to an inflating source, the first opening comprising a diameter that is greater than the second opening, the first part of the inflation valve comprising an end disposed adjacent an injection nozzle, said injection nozzle having a smaller diameter than the second opening, a sealing joint disposed adjacent the injection nozzle and the upper bridge, and one of the injection nozzle and the first part engaging one of the first opening and the second opening.

4. A rim as defmed by claim 3, wherein the injection nozzle one of brushes an external surface of the upper bridge and stands back with respect to the external surface.

5. A rim as defined by claim 3, wherein the opening of the lower bridge is bored and threaded and engages external threads of the first part.

6. A rim as defined by claim 3, wherein the second opening of the upper bridge is bored and threaded and engages external threads of the injection nozzle.

7. A rim as defined by claim 3, wherein the inflation valve further comprises a ring disposed on the body for engaging an outer surface of the lower bridge.

8. A cycle wheel for a tubeless tire, comprising:

a rim connected to a central hub via a plurality of spokes, the rim comprising a casing formed by an upper bridge, a lower bridge, two flanks that extend beyond the upper bridge via two tire gripping wings, a first opening in the lower bridge and a second opening in the upper bridge for the passage of the inflation valve, the inflation valve comprising a body including a first part designed to cross the casing and a second part designed to connect to an inflating source, the first opening comprising a diameter that is greater than the second opening, the first part of the inflation valve comprising an end disposed adjacent an injection nozzle, said injection nozzle having a smaller diameter the second opening, a sealing joint disposed adjacent the injection nozzle and the upper bridge, and one of the injection nozzle and the first part engaging one of the upper bridge and the lower bridge of the rim.

9. An inflation valve for inflating a tubeless bicycle tire mounted on a rim, the rim comprising a lower bridge for engaging a plurality of spokes, an upper bridge, two lateral flanks, and two tire gripping wings extending beyond the upper bridge, the valve comprising:

a cylindrical body comprising a first part, a second part, and an conduit opening extending from one end to another end;

the first part comprising an upper bridge engaging end and having a first diameter for extending through a lower bridge opening;

the second part being adapted to connect to an inflating source;

an injection nozzle disposed adjacent the upper bridge engaging end and adapted to cooperating with the upper bridge opening, said injection nozzle comprising a diameter which is smaller than the first diameter;

a sealing joint disposed adjacent the injection nozzle and the upper bridge engaging end for sealing the first part to the upper bridge;

wherein one of the first part and the injection nozzle comprises external threads for cooperating with complementary internal threads in one of the lower bridge and the upper bridge.

10. The valve of claim 9, wherein the first part comprises external threads for engaging internal threads of the lower bridge.

11. The valve of claim 9, wherein the injection nozzle comprises external threads for engaging internal threads of the upper bridge.

12. The valve of claim 9, wherein the second part comprises external threads.

13. The valve of claim 12, further comprising ring having internal threads which cooperated with external threads of the second part.

14. The valve of claim 9, further comprising a ring which is moveably disposed on the body.

15. An inflation valve for inflating a tubeless bicycle tire mounted on a rim having a lower bridge and a sealed upper bridge, the valve comprising:

a cylindrical body comprising external threads and an opening extending from an air inflation end to an upper bridge engaging end, the opening at the upper bridge engaging end comprising an internal diameter;

the inflation end being adapted to connect to an inflating source;

an injection nozzle comprising a diameter which is greater than the internal diameter and disposed adjacent the upper bridge engaging end;

a sealing joint disposed adjacent the injection nozzle and the upper bridge engaging end;

wherein the injection nozzle is moveable towards and away from the upper bridge engaging end.

* * * * *